(12) United States Patent
Barto et al.

(10) Patent No.: US 9,504,243 B1
(45) Date of Patent: Nov. 29, 2016

(54) RODENT TRAP

(71) Applicants: Vincent Barto, Antrim, NH (US); James Barto, Antrim, NH (US)

(72) Inventors: Vincent Barto, Antrim, NH (US); James Barto, Antrim, NH (US)

(*) Notice: Subject to any disclaimer, the term of this patent is extended or adjusted under 35 U.S.C. 154(b) by 202 days.

(21) Appl. No.: 14/329,285

(22) Filed: Jul. 11, 2014

Related U.S. Application Data (60) Provisional application No. 61/938,361, filed on Feb. 11, 2014.

(51) Int. Cl.
 *A01M 23/08* (2006.01)
 *A01M 23/02* (2006.01)
 *A01M 25/00* (2006.01)

(52) U.S. Cl.
 CPC ............ *A01M 23/08* (2013.01); *A01M 25/00* (2013.01); *A01M 2200/00* (2013.01)

(58) Field of Classification Search
 CPC .................. A01M 23/08; A01M 25/00
 USPC ................. 43/58, 60, 61, 64, 65–67
 See application file for complete search history.

(56) References Cited

U.S. PATENT DOCUMENTS

| | | | | |
|---|---|---|---|---|
| 1,371,318 A | * | 3/1921 | McMonigal | A01K 57/00 43/107 |
| 1,488,503 A | * | 4/1924 | Karda | A01M 23/08 43/66 |
| 1,543,968 A | * | 6/1925 | Williams | A01K 97/04 43/121 |
| 1,618,513 A | * | 2/1927 | Coghill | A01M 23/08 43/66 |
| 2,193,937 A | * | 3/1940 | Pirani | A01M 23/02 43/65 |
| 2,480,724 A | | 8/1949 | Fuessner | |
| 2,488,466 A | * | 11/1949 | Carver | A01M 23/04 43/65 |
| 2,501,043 A | * | 3/1950 | Giacoletto | A01M 23/20 43/69 |
| 2,683,326 A | | 7/1954 | Garnder et al. | |
| 3,320,692 A | * | 5/1967 | Hellen | A01M 23/16 43/131 |
| 3,940,876 A | * | 3/1976 | Zaccaira | A01M 25/004 43/131 |
| 4,214,399 A | * | 7/1980 | Bradley | A01M 23/08 43/66 |
| 4,541,198 A | | 9/1985 | Sherman | |
| 4,630,392 A | * | 12/1986 | Ferraro | A01M 25/004 43/131 |
| 4,945,673 A | * | 8/1990 | Lavelle | A01M 1/2011 43/124 |
| 5,471,781 A | * | 12/1995 | Vine | A01M 23/04 43/69 |
| 5,943,817 A | | 8/1999 | Miller | |
| 5,950,355 A | | 9/1999 | Gilbert | |
| 6,016,623 A | * | 1/2000 | Celestine | A01M 23/04 43/61 |
| 6,145,242 A | | 11/2000 | Simpson | |

(Continued)

OTHER PUBLICATIONS http://www.mousetraps.org.uk/Mouse-Traps/Disguise-A-Trap (Sep. 27, 2010).

*Primary Examiner* — Marc Burgess
(74) *Attorney, Agent, or Firm* — Robert C. Montgomery; Montgomery Patent & Design LP (57) ABSTRACT

A rodent trap apparatus includes a mounting assembly connected to a support surface. The mounting assembly includes an access hole. The apparatus includes a canister assembly connected to the mounting assembly. The canister assembly includes a restricting orifice aligned with the access hole. The apparatus includes a lid assembly connected to the canister assembly. The access hole and the restricting orifice allow a rodent to enter the canister assembly but not exit the canister assembly.

17 Claims, 6 Drawing Sheets

(56) References Cited

U.S. PATENT DOCUMENTS

| | | |
|---|---|---|
| 6,266,917 B1 | 7/2001 | Hight |
| 6,877,270 B2 | 4/2005 | Nelson et al. |
| 7,051,472 B1 * | 5/2006 | Kelly .................... A01M 1/023 43/58 |
| 7,051,473 B2 * | 5/2006 | Hoppe ................. A01M 1/2011 43/131 |
| D607,080 S | 12/2009 | Lovelace |
| 8,291,637 B2 * | 10/2012 | Patterson .............. A01M 23/30 43/81 |
| 2002/0167409 A1 * | 11/2002 | Cristofori ............. A01M 23/04 43/58 |
| 2003/0084603 A1 * | 5/2003 | Lafforthun ........... A01M 23/16 43/61 |
| 2003/0110679 A1 * | 6/2003 | Collins ................ A01M 23/30 43/81 |

\* cited by examiner

RODENT TRAP

RELATED APPLICATIONS

The present invention was first described in and claims the benefit of U.S. Provisional Application No. 61/938,361, filed Feb. 11, 2014, the entire disclosures of which are incorporated herein by reference.

FIELD OF THE INVENTION

The present invention relates generally to pest control and, more particularly, to a rodent trap that mimics the appearance of a smoke detector.

BACKGROUND OF THE INVENTION

Rats, mice, and other rodents are persistent problems in almost all areas of the world. In order to control such pests, people have resorted to various methods to eradicate them, such as traps or poison.

However, for these methods to be their most effective, they must be placed in areas where these rodents commonly travel. This requirement often places them in areas where they can commonly be seen such as along wall, hallways, and aisles. Of course this is very disconcerting to guests, visitors, clients, employees, or virtually anyone who comes into visual contact with them. This drawback often leads to the traps or poisons being moved to hidden areas where they are less effective, and subsequently allows the rodent population to thrive.

Accordingly, there is a need for a means by rodent traps and/or poison can be ideally positioned to eradicate such pests, but remain inconspicuous to the unknowing eye.

SUMMARY OF THE INVENTION

The inventor has recognized the aforementioned inherent problems and lack in the art and observed that there is a need for a device configured to hide rodent traps in a manner that places them in ideal locations, but keeps them inconspicuous as well. The development of the present invention, which will be described in greater detail herein, substantially departs from conventional solutions to fulfill this need.

In one embodiment, the disclosed rodent trap apparatus includes a mounting assembly connected to a support surface. The mounting assembly includes an access hole. The apparatus includes a canister assembly connected to the mounting assembly. The canister assembly includes a restricting orifice aligned with the access hole. The apparatus includes a lid assembly connected to the canister assembly. The access hole and the restricting orifice allow a rodent to enter the canister assembly but not exit the canister assembly.

In another embodiment, the disclosed rodent trap apparatus includes a mounting assembly connected to a support surface. The mounting assembly includes a mounting assembly body, an access hole disposed through the mounting assembly body, the access hole being suitably sized to allow ingress of a rodent, and a slide plate movably connected to an interior surface of the mounting assembly body to cover the access hole. The apparatus includes a canister assembly removably connected to the mounting assembly. The canister assembly includes a tubular canister body including an open first end connected to the mounting assembly body and an open second end opposite the open first end, the canister body defining an internal space, a barrier panel disposed near the open first end to enclose the internal space, a restricting orifice disposed through the barrier panel, the restricting orifice comprising an inwardly tapered funnel extending into the internal space, the funnel comprising an entrance aperture suitably sized to allow ingress of the rodent into the internal space and an exit aperture suitably sized to prevent egress from within the internal space, the restricting orifice being offset from a center of the barrier panel, and the restricting orifice being aligned with the access hole when the canister assembly is connected to the mounting assembly. The apparatus includes a lid assembly connected to the canister assembly. The lid assembly includes a lid body connected to the open second end of the canister body to enclose the internal space. The rodent is entrapped within the internal space after passing through the access opening and the restricting orifice.

In yet another embodiment, the lid assembly of the disclosed rodent trap apparatus includes an indicator button movably connected to the lid body. The indicator button is aligned with the restricting orifice. The indicator button includes a top surface disposed within the internal space and a bottom surface disposed outside of the lid body. The indicator button is linearly translatable between a raised position indicating that the rodent is not within the internal space and a depressed position indicating that the rodent is within the internal space. The lid assembly includes an alarm assembly. The alarm assembly is actuated by the indicator button when the indicator button is in the depressed position.

Furthermore, the described features and advantages of the disclosure can be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY

10 rodent trap apparatus
20 canister assembly
22 canister body
23 internal space
24 upper bather panel
26 restricting orifice
27 exit aperture 28 male threaded region
30 first bayonet feature
40 lid assembly
42 lid body
43 female threaded region
50 mounting assembly
52 mounting assembly body
54 flange
55 second bayonet feature
56 rodent access hole
58 slide plate
59 slide plate handle
60 slide plate slot
70 ceiling panel
72 ceiling/wall aperture
74 wall panel
80 fastener
82 anchor
90 rodent
92 rodent path
94 attractant/poison
95 liner
100 rodent trap apparatus
140 lid assembly
142 lid body
143 indicator button aperture
144 indicator button
145 top surface
146 bottom surface
147 alarm assembly
148 switch
150 lamp
152 battery
200 rodent trap apparatus
220 canister assembly
222 canister body
243 indicator button aperture
300 rodent trap apparatus
320 recessed housing assembly
322 recessed housing
340 lid assembly
342 finger relief feature
354 flange

DETAILED DESCRIPTION OF THE
PREFERRED EMBODIMENT

In accordance with the invention, the best mode is presented in terms of a one or more of the disclosed embodiments, herein depicted within FIGS. 1 through 6. However, the disclosure is not limited to a single described embodiment and a person skilled in the art will appreciate that many other embodiments are possible without deviating from the basic concept of the disclosure and that any such work around will also fall under its scope.

Further, those skilled in the art will recognize that other styles and configurations can be incorporated into the teachings of the present disclosure, and that the example configurations shown and described herein are for the purpose of clarity and disclosure and not by way of limitation.

As used herein, the singular terms "a", "an", and "the" do not denote a limitation of quantity, but rather denote the presence of at least one (1), as well as a plurality of, the referenced items, unless the context clearly indicates otherwise.

As used herein, the terms "first", "second", "third", etc. are used as labels to describe various elements, features, and/or components, and are not intended to impose ordinal, positional, or hierarchical requirements on the referenced items, unless other indicated. For example, such terms may be used to distinguish one element from another element.

As used herein, relative terms such as "front", "rear", "left", "right", "top", "bottom", "below", "above", "upper", "lower", "horizontal", or "vertical" are used to describe a relationship of one (1) element, feature and/or region to another element, feature and/or region as illustrated in the figures.

Referring to FIGS. 1-6, disclosing a rodent trap apparatus (herein referred to as the "apparatus") 10, where like reference numerals represent similar or like parts. Generally, the apparatus 10 provides a flush-mounted (e.g., permanently installed) rodent trap that resembles (e.g., mimics in appearance) a surface-mounted smoke alarm. The apparatus 10 includes a three-part assembly that is mounted to internal surfaces of a building or residence, such as a ceiling panel 70 (FIG. 1), a wall panel 74 (FIG. 5), or a floor (not shown).

Figure 1:
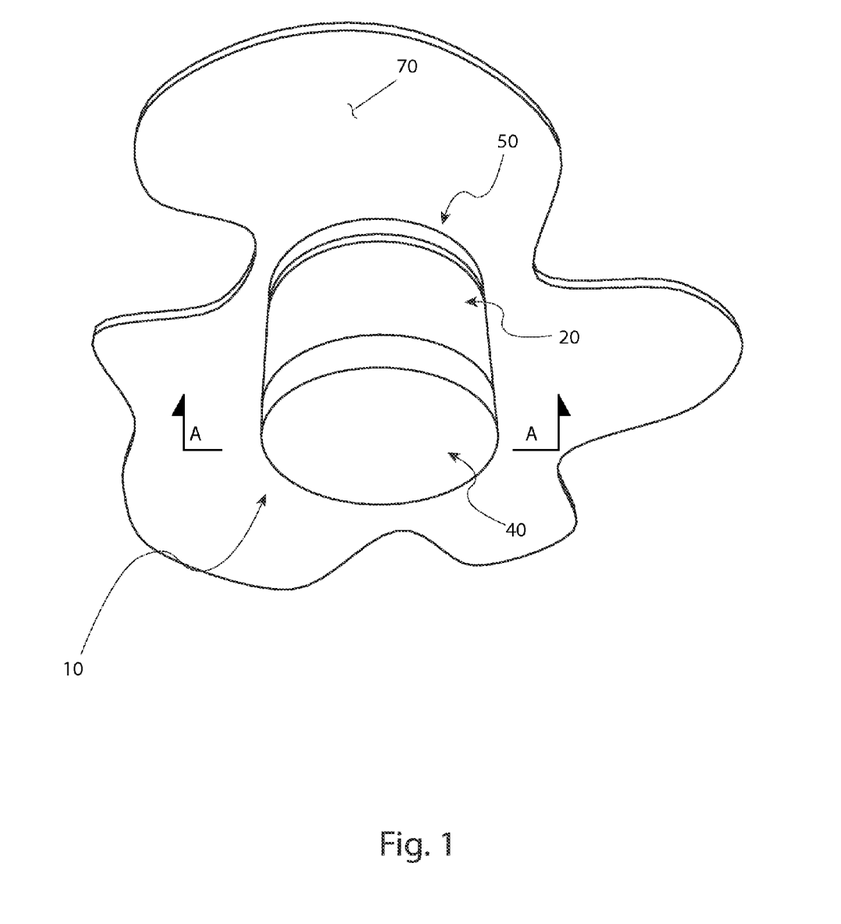
FIG. 1 is a perspective view of the disclosed rodent trap apparatus, according to one (1) embodiment.
Figure 5:
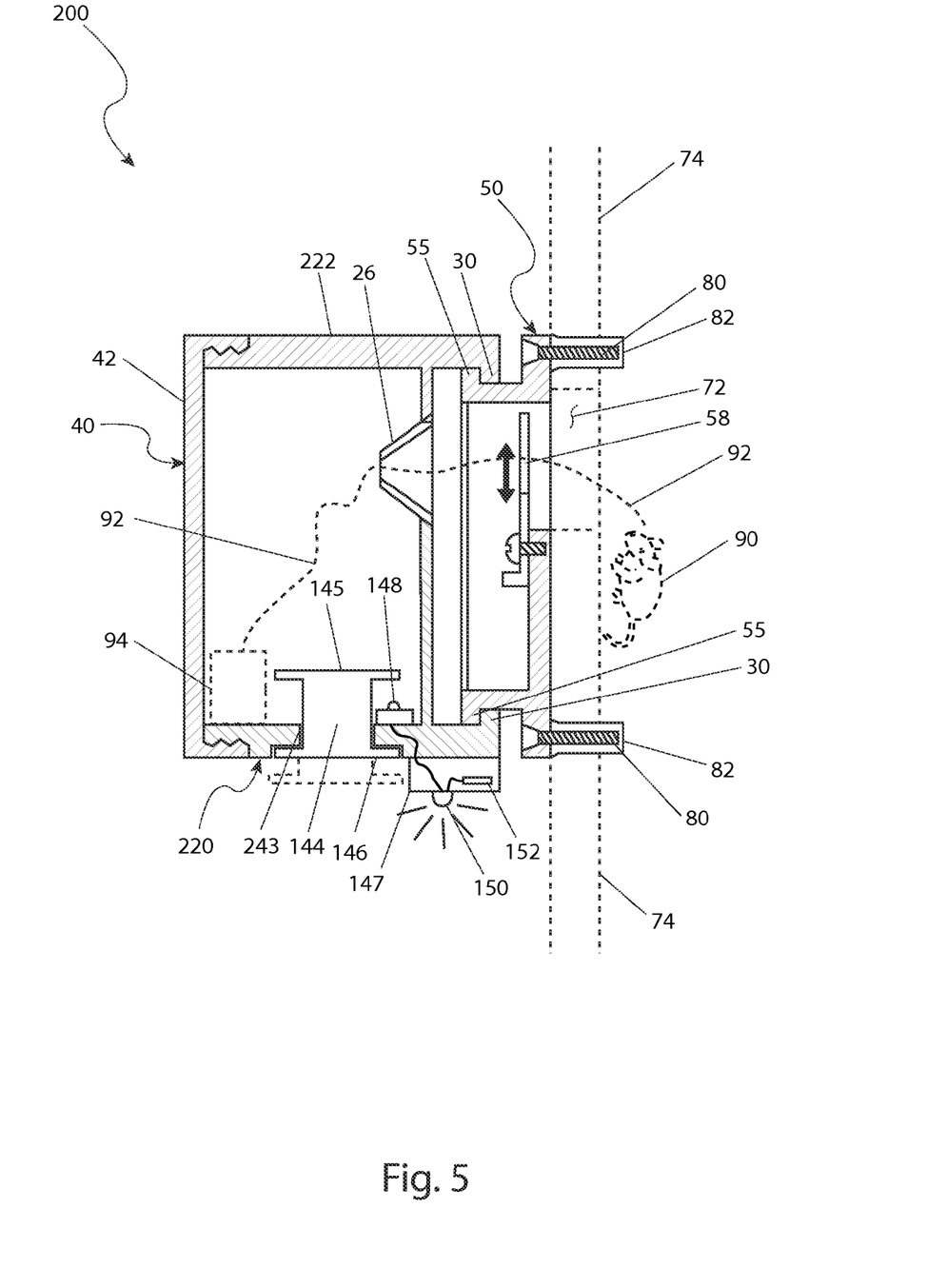
FIG. 5 is a sectional view of the rodent trap apparatus, according to another embodiment; and, FIG. 6 is a sectional view of the rodent trap apparatus, according to another embodiment.

Referring to FIG. 1, the apparatus 10 includes a (e.g., first) canister assembly 20, a lid assembly 40 connected to the canister assembly 20, and a mounting assembly 50. The mounting assembly 50 is mounted to a surface of the ceiling panel (e.g., ceiling) 70 or wall panel (e.g., wall) 74. The canister assembly 20 is connected to the mounting assembly 50. The apparatus 10 entraps a rodent 90 (e.g., a mouse) (FIG. 3), for example, which occupies an area behind the ceiling panel 70 or a wall panel 74 of a building or other structure.

In an example construction, the apparatus 10 is suitable for catching a mouse and is approximately six inches (6 in.) in diameter and four inches (4 in.) in height. However, those skilled in the art will appreciate that the apparatus 10 can include and/or be introduced in various sizes suitable for trapping particular targeted rodents 90, such as squirrels, chipmunks, rats, and the like.

Figure 2:
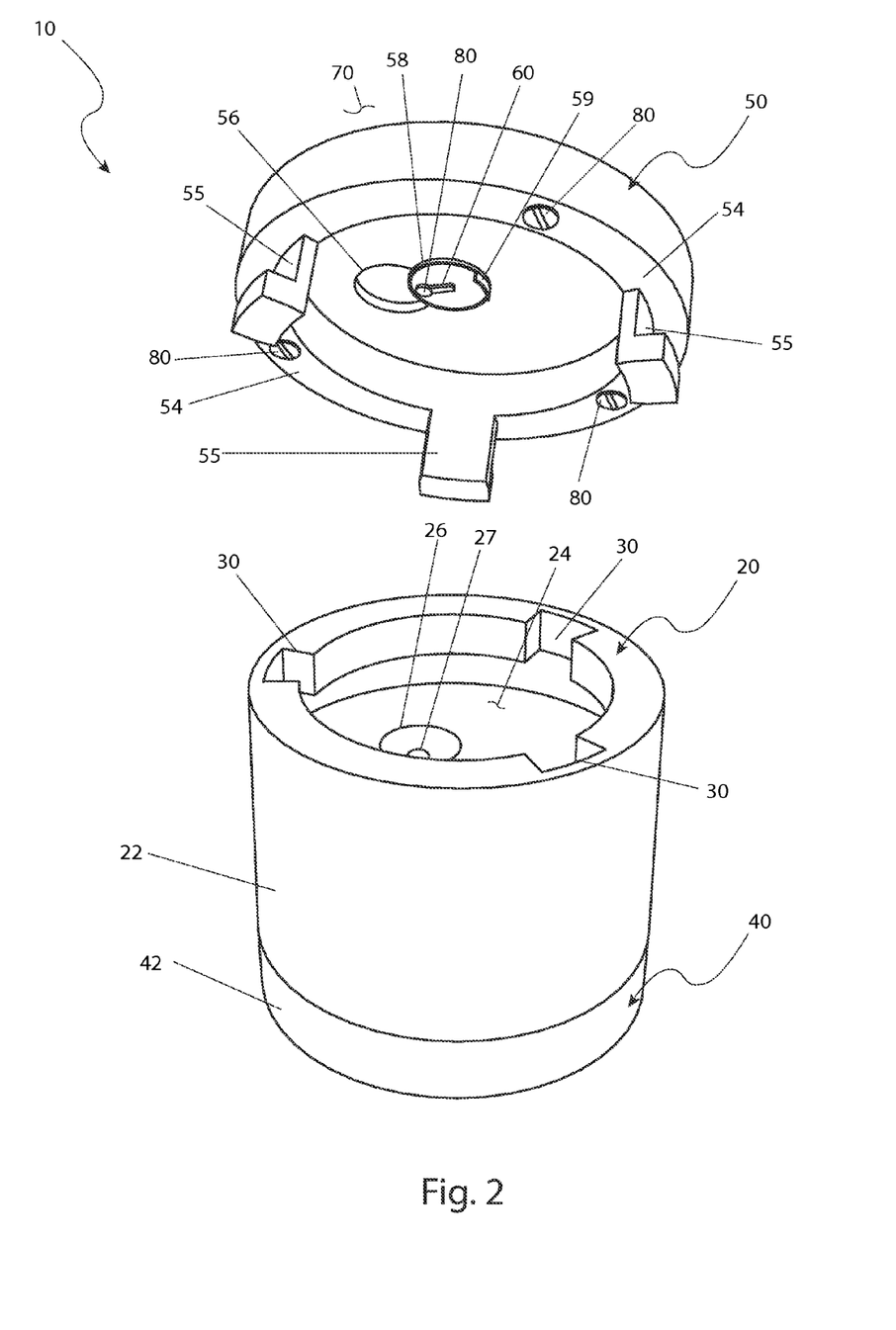
FIG. 2 is a partially exploded perspective view of the rodent trap apparatus of FIG. 1.

Referring to FIG. 2, the mounting assembly 50 includes a circular rodent access hole 56 disposed through a top surface and a correspondingly shaped slide plate 58 movably connected along an interior of the top surface. The rodent access hole 56 is positioned parallel to the ceiling panel 70 and selectively blocks a ceiling/wall aperture 72 (FIG. 3) cut into the ceiling panel 70. The slide plate 58 prevents possible escape of additional rodents 90 from within (e.g., behind) the ceiling panel 70, for example, during the temporary removal of the canister assembly 20 from the mounting assembly 50 to prepare and/or purge (e.g., remove trapped rodents) the apparatus 10. The slide plate 58 is guided in a linear (e.g., horizontal) direction via a slide plate slot 60 and a corresponding fastener 80 that is affixed to the top surface of the mounting assembly 50 and operatively engaged with the slide plate 58, such as a screw. The slide plate 58 includes an integral and downwardly protruding slide plate handle 59. Once the canister assembly 20 is removed from the mounting assembly 50, a user may press upon the slide plate handle 59 and slide the slide plate 58 over the rodent access hole 56 and close off the ceiling aperture 72.

Figure 3:
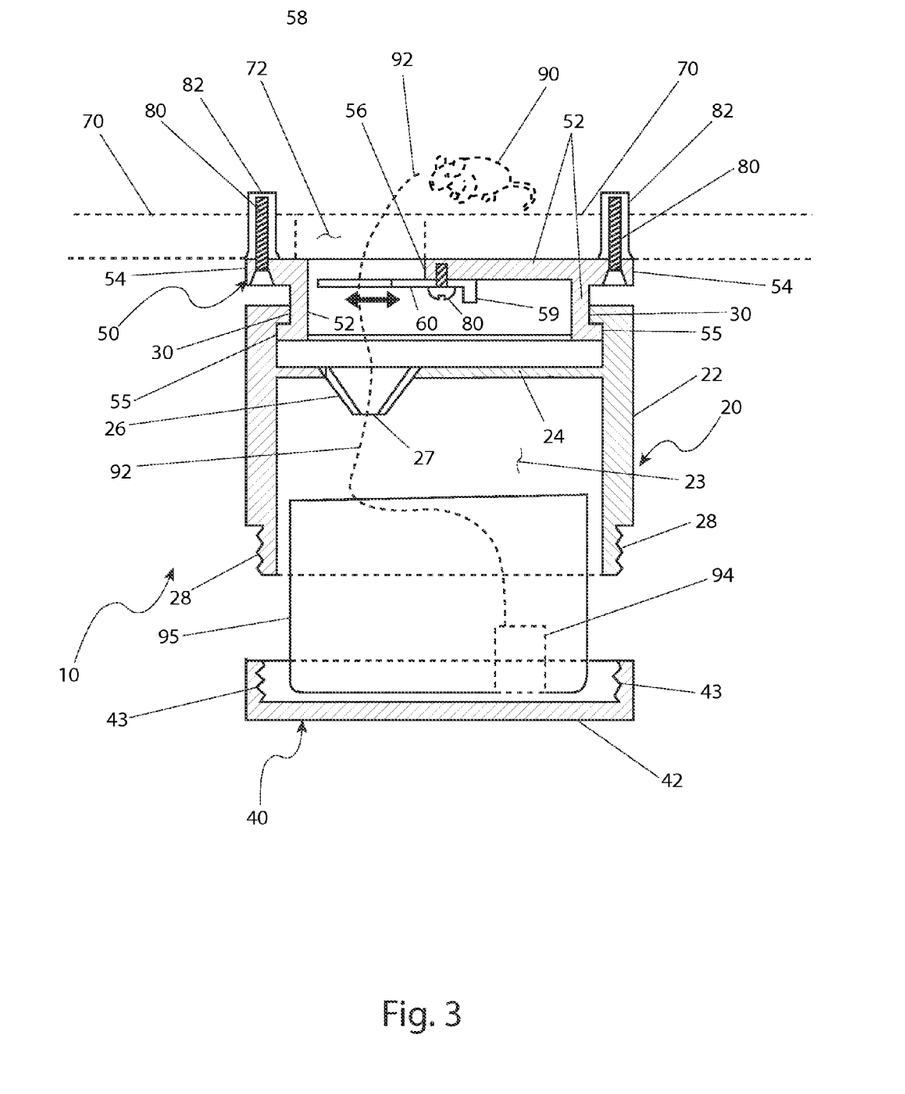
FIG. 3 is a sectional view of the rodent trap apparatus taken along section line A-A of FIG. 1.

Referring to FIGS. 2 and 3, in use, the rodent 90 enters the canister assembly 20 by passing through the ceiling/wall aperture 72, then passing through the rodent access hole 56, and finally passing through a restricting orifice 26 of the canister assembly 50. The rodent 90 is contained securely within the canister assembly 20 being lured into the apparatus 10 by a quantity of attractant/poison 94 contained within the canister assembly 20. The rodent 90 can be removed and/or disposed of by detaching the canister assembly 20 from the mounting assembly 50, removing (e.g., unscrewing) the lid assembly 40 from the canister assembly 20, and discarding the rodent 90 in a suitable receptacle, if dead, or releasing the rodent 90 outside of the building, if a live release is desired.

The canister assembly 20 is removably attached to the mounting assembly 50 via mating engagement of a plurality of interlocking first bayonet features 30 and respective plurality of second bayonet features 55. The first bayonet features 30 provide "quarter-turn" attachment to the mating second bayonet features 55. In an example construction, the bayonet features 30, 55 are arranged and spaced in an asymmetrical manner allowing interlocking attachment at a particular orientation, thereby resulting in alignment of the rodent access hole 56 of the mounting assembly 50 and the restricting orifice 26 of the canister assembly 20.

Referring to FIG. 3, the canister assembly 20 includes a hollow cylindrical (e.g., first) canister body 22 defining an internal space 23 into which the rodent 90 becomes entrapped. In an example construction, the canister assembly 20 includes an exterior male threaded region 28 all around a lower perimeter edge, which provides attachment of the lid assembly 40. The canister assembly 20 includes an upper bather panel 24. The upper barrier panel 24 is a solid panel member extending the diameter of the canister assembly 20. The upper barrier panel 24 is configured to prevent the rodent 90 from escaping after having entered the canister body 22.

For example, the upper barrier panel 24 provides a horizontal enclosing surface located subjacent to (e.g., below) the first bayonet features 30. The upper barrier panel 24 includes the restricting orifice 26 defined therethrough. In an example construction, the restricting orifice 26 includes an integral and downwardly tapering "funnel-shaped" body extending from the upper barrier panel 24.

A rodent path 92 is shown in FIG. 3, by example, illustrating the rodent 90 entering and passing downwardly through the restricting orifice 26 and entering into the canister body 22. The bottom of the restricting orifice 26 provides an exit aperture 27 having a reduced diameter compared to the diameter of the restricting orifice 26 at the upper barrier panel 24 (e.g., entrance aperture), thereby preventing the rodent 90 from escaping from the apparatus 10. In an example construction, the restricting orifice 26 is positioned in an "off-centered" manner to further avoid escape of the rodent 90 when the apparatus 10 is utilized upon a wall panel 74 (FIG. 5).

The inverted lid assembly 40 is connected to a bottom edge of the canister assembly 20. The lid assembly 40 includes a shallow round cup-shaped lid body 42 having a female threaded region 43 all around an interior upper perimeter edge. The female threaded region 43 enables threaded attached of the lid assembly 40 to the corresponding male threaded region 28 located along the bottom (e.g., lower) edge of the canister body 22.

The lid assembly 40 supports a replaceable and/or disposable internal liner 95, which in turn receives and contains a quantity of rodent attractant/poison 94 therein. In an example implementation, the rodent attractant/poison 94 is a commercially-available product designed to attract, and if desired, humanely kill the rodent 90 while within the canister body 22.

During preparation of the apparatus 10, the liner 95 is inserted into the internal space 23 through a bottom opening of the canister body 22 and the lid assembly 40 is threadingly attached to the canister body 22, thereby supporting the liner 95. The liner 95 provides a disposable cup-shaped and open-topped vessel having a cylindrical shape similar to that of the internal space 23 within the canister body 22. The liner 95 is positioned to receive the rodent 90 as it exits the restricting orifice 26 (e.g., the exit aperture 27). In an example construction, the liner 95 is made using a low-cost and waterproof material such as, but not limited to: TYVEK®, polyethylene, polypropylene, or the like.

When disposing of a dead rodent 90, the lid assembly 40 is removed and the dead rodent 90, the liner 95, and the attractant/poison 94 are removed together and disposed of into an appropriate disposal container. The apparatus 10 can be restored for subsequent use by inserting a new liner 95 containing a quantity of attractant/poison 94 into the canister body 22 and the lid assembly 40 replaced.

The mounting assembly 50 includes an inverted cup-shaped mounting assembly body 52 having an integral (e.g., first) flange 54 all around an upper perimeter edge, which provides attachment to the ceiling panel 70 or wall panel 74 using a plurality of threaded fasteners 80 and/or corresponding wall anchors 82. In an embodiment, fasteners 80 (e.g., screws) are disposed through the flange 54 and connected to the ceiling panel 70 to mount the mounting assembly 50 (e.g., and the apparatus 10) to the ceiling. In an example construction, the fasteners 80 can be countersunk to facilitate caps or covers to provide a more aesthetic appearance.

In an example construction, the circular rodent access hole 56 is disposed through a horizontal surface of the mounting assembly body 52 and the correspondingly shaped slide plate 58 is connected along an inner surface of the mounting assembly body 52.

Figure 4:
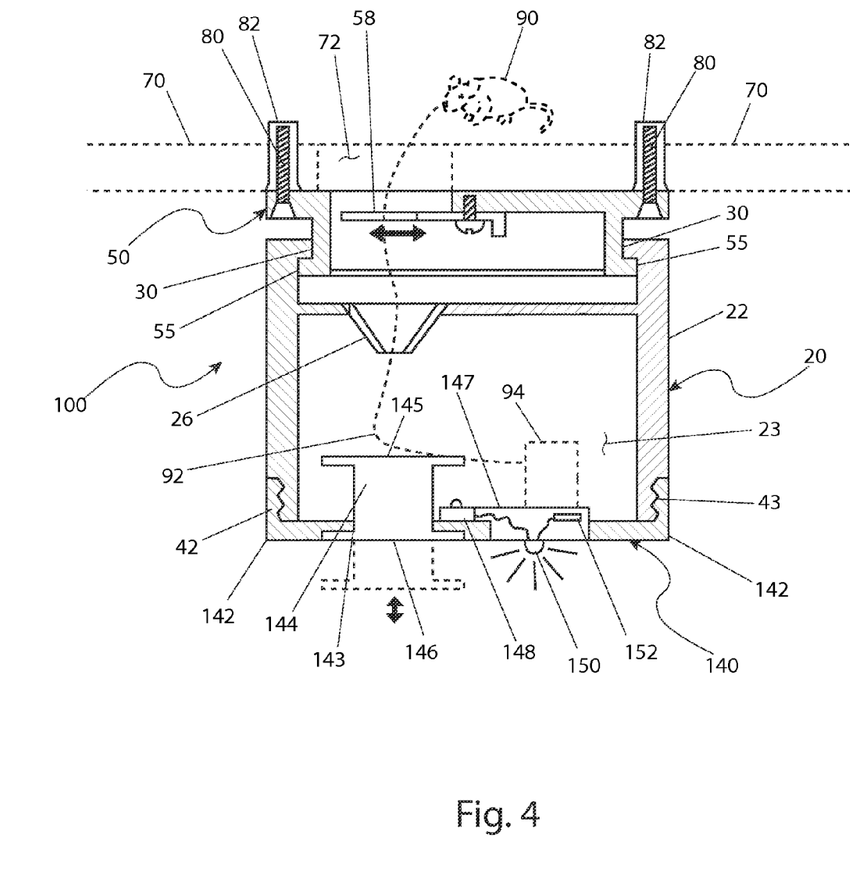
FIG. 4 is a sectional view of the rodent trap apparatus, according to another embodiment.

Referring to FIG. 4, another embodiment of the disclosed rodent trap apparatus, referred to herein as the apparatus 100, illustrates an alarm embodiment. The apparatus 100 includes a visual indicator to communicate to a user that the rodent 90 has entered the canister assembly 20. The apparatus 100 includes a substantially similar construction and function as shown and described for the apparatus 10 (FIGS. 1-3).

The apparatus 100 includes a (e.g., first alternate) lid assembly 140 which includes components designed to communicate the presence of the rodent 90. The lid assembly 140 includes a lid body 142 having a (e.g., first) indicator button aperture 143 and an indicator button 144 movably disposed within the indicator button aperture 143. In an example construction, the indicator button 144 includes a cylindrical spool shape having a horizontally protruding top surface 145 and a horizontally protruding bottom surface 146.

The body of the indicator button 144 (e.g., the portion between the top surface 145 and bottom surface 146) is held within the indicator button aperture 143 and is retained at either a raised position or a depressed position, for example, via a friction fit. The top surface 145 of the indicator button 144 is positioned directly below the restricting orifice 26 of the canister assembly 20. As the rodent 90 passes through the exit aperture 27 of the restricting orifice 26, the rodent contacts the top surface 145 causing the indicator button 144 to move from the raised position to the depressed position.

The repositioning of the indicator button 144 by the rodent 90 causes the bottom surface 146 of the indicator button 144 to protrude downwardly from the bottom external surface of the lid assembly 140, thereby being externally observable by the user and communicating that the rodent 90 has entered the apparatus 100. In an example construction, the bottom surface 146 of the indicator button 144 is painted a bright color to attract the attention of the user when in the depressed position.

In another embodiment, the indicator button 144 provides coincidental mechanical contact and electrical activation of an alarm assembly 147. The alarm assembly 147 includes a miniature plastic module being integrated within the lid assembly 140, which contains a switch 148, a battery 152, and a lamp 150. Upon depression of the indicator button 144, the upper surface 145 contacts the subjacent switch 148 of the alarm assembly 147. In a specific, non-limiting example construction, the switch 148 is a MICROSWITCH® or similar electrical contact closure device which in turn causes electric current from the battery 152 to be conducted to the lamp 150 to provide illumination to further communicate the presence of the rodent 90 to the user.

Referring to FIG. 5, another embodiment of the disclosed rodent trap apparatus, referred to herein as the apparatus 200, illustrates a wall-mounted embodiment. The apparatus 200 includes a substantially similar construction and functionality as shown and described for the apparatus 10 (FIG. 1-3) and/or the apparatus 100 (FIG. 4).

However, the apparatus 200 includes a (e.g., second) canister assembly 220 including a (e.g., second) canister body 222 that positions the indicator button 144 within a (e.g., second) indicator button aperture 243 and the alarm assembly 147 along a bottom surface of the canister body 222. As described herein above, the offset position of the restricting orifice 26 enables orientation of the restricting orifice 26 at an elevated location directly above the indicator button 144 when mounted vertically. In a substantially similar manner as described herein above for the apparatus 100 (FIG. 4), upon the rodent 90 exiting the restricting orifice 26, the rodent 90 contacts the top surface 145 of the indicator button 144, as illustrated by the rodent path 92 in FIG. 5, resulting in repositioning of the indicator button 144 from the raised position to the depressed position and illumination of the lamp 150 to alert the user.

Figure 6:
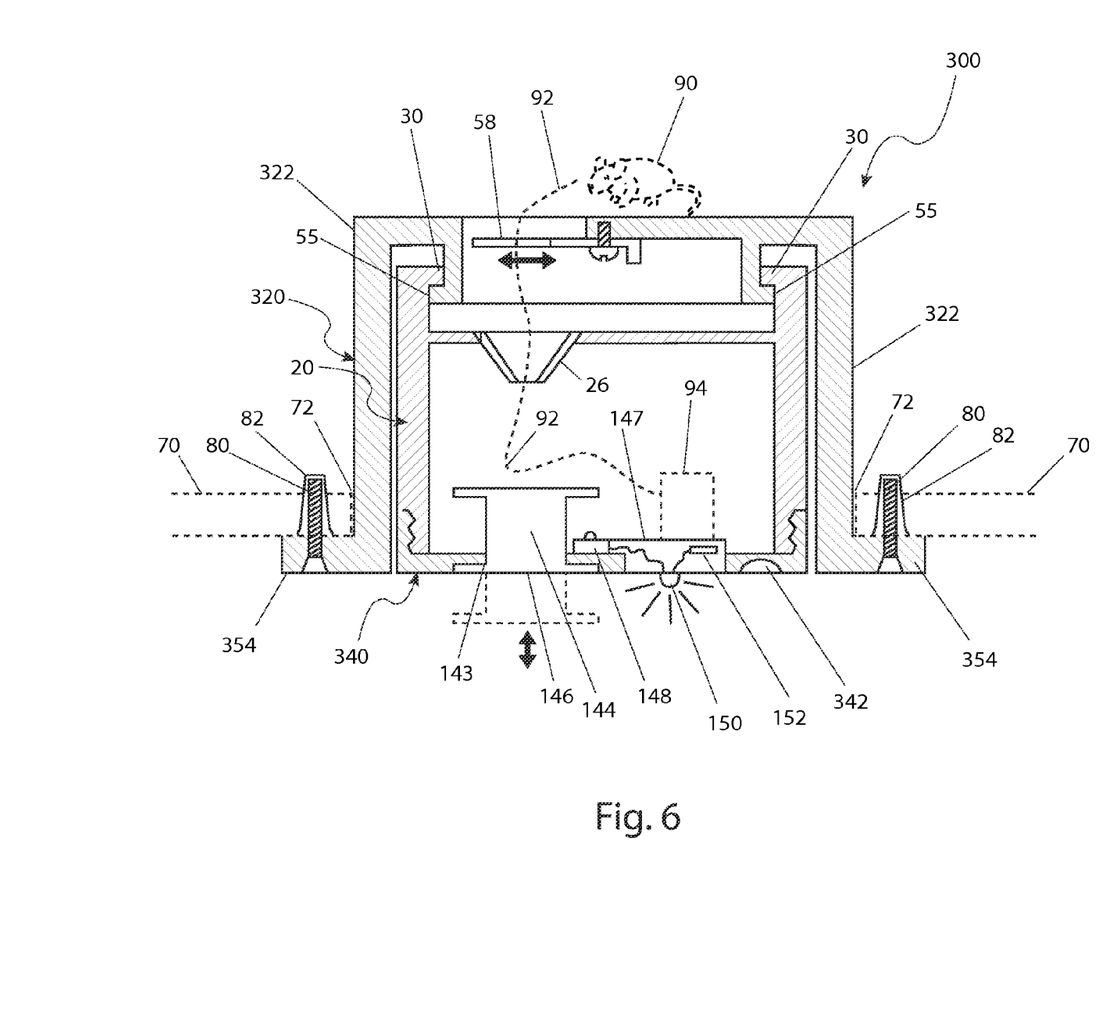

Referring to FIG. 6, another embodiment of the disclosed rodent trap apparatus, referred to herein as the apparatus 300, illustrates a recessed embodiment. The apparatus 300 provides discrete installation along a ceiling panel 70 (as shown in FIG. 6) or a wall panel 74 (not shown), in a flush-mounted manner using the plurality of fasteners 80. The recessed embodiment 300 includes substantially similar construction and functionality as shown and described for the apparatus 10 (FIGS. 1-3) and/or the apparatus 100 (FIG. 4). However, the apparatus 300 includes a recessed housing 322 in lieu of the previously described mounting assembly 50 (FIGS. 1-4).

The recessed housing 322 includes a (e.g., second) flange 354 that provides flush-mounting of the apparatus 300 using the fasteners 80 and/or anchors 82. In an example construction, the fasteners 80 are countersunk to facilitate caps or covers to provide a more aesthetic appearance.

The recessed housing 322 is connected to the canister assembly 20 using the bayonet features 30, 55 via a quarter-turn attachment. The recessed embodiment 300 includes a (e.g., second alternate) lid assembly 340. The lid assembly 340 includes a substantially similar construction and alarm components as the previously described lid assembly 140 (FIG. 4). However, the lid assembly 340 includes a plurality of recessed finger relief features 342 disposed along a bottom surface that allow rotation and removal of the lid assembly 340 from the canister assembly 20 in order to remove the canister assembly 20 from the recessed housing 322.

Those skilled in the art will recognize that other styles and configurations of the disclosed apparatus 10, 100, 200, 300 can be easily incorporated into the teachings of the present disclosure, and only particular configurations have been shown and described for purposes of clarity and disclosure and not by way of limitation of scope.

The disclosed embodiments of the apparatus (e.g., apparatus 10, 100, 200, 300) can be utilized by the common user in a simple and effortless manner with little or no training. After initial purchase or acquisition of the disclosed apparatus, it would be installed as illustrated in FIGS. 3-6.

One embodiment of the disclosed method for installing the apparatus 10 includes the following steps: 1). procuring the apparatus 10; 2). cutting a ceiling aperture 72 into the ceiling (e.g., ceiling panel 70) at a location that corresponds to an intended location of the rodent access hole 56 of the mounting assembly 50; 3). mounting the flange 54 of the mounting assembly 50 to the ceiling panel 70 using the fasteners 80 and/or drywall anchors 82 such that the ceiling aperture 72 is aligned with the rodent access hole 56; 4). sliding the slide plate 58 of the mounting assembly 50 to an open position, if not previously opened; 5). attaching the canister assembly 20 to the mounting assembly 50 by engaging respective first bayonet features 30 and second bayonet features 55; 6). rotating the canister assembly 20 one-quarter of a turn to lock the first 30 and second 55 bayonet features together; 7). placing a quantity of rodent attractant/poison 94 into a liner 95; (8) placing the liner 95 into the lid body 42; 9). inserting a top portion of the liner 95 up into the internal space 23 of the canister assembly 20; and 10). attaching the lid body 42 of the lid assembly 40 containing the liner 95 into the canister assembly 20 by engaging and rotating respective female threaded region 43 and male threaded region 28 portions.

One (1) embodiment of the disclosed method for utilizing the apparatus 10 includes the following steps: 1). checking the apparatus 10 periodically for the presence of a captured rodent 90 within the canister assembly 20 by rotating the canister assembly 20 one-quarter (¼) of a turn and removing the canister assembly 20 from the mounting assembly 50; 2). sliding the slide plate 58 to a closed position using the slide plate handle 59; 3). inspecting the contents of the liner 95; 4). disposing of a captured dead rodent 90 by discarding the liner 95, the attractant/poison 94, and the rodent 90 into an appropriate trash receptacle or performing a live release of the rodent 90 outside the building if using an attractant 94; 5). restoring the apparatus 10 by installing a new liner 95 and quantity of attractant/poison 94 as previously described; 6). sliding the slide plate 58 to the open position; and 7). reattaching the canister assembly 20 and lid assembly 40.

One (1) embodiment of the disclosed method for installing and utilizing the apparatus 100 includes the following steps: 1). installing the mounting assembly 50 to the ceiling panel 70 as previously described; 2). attaching the first canister assembly 20 as previously described; 3). installing a fresh battery 152 into the alarm assembly 147 of the first alternate lid assembly 140; 4). sliding the indicator button 144 to the "up" (e.g., raised) position; 5). threadingly attaching the lid assembly 140 onto the canister assembly 20 as previously described; 6). determining the presence of a captured rodent 90 by observing the position of the indicator button 144 and/or by observing the illumination of the lamp 152; and, 7). disposing or releasing of any captured rodents 90 as previously described.

One embodiment of the disclosed method for installing and utilizing the apparatus 200 includes the following steps: 1). cutting a wall aperture 72 into the wall (e.g., wall panel 74) at a location that corresponds to an intended location of the rodent access hole 56 of the mounting assembly 50; 2).

installing the mounting assembly 50 to the wall panel 74 in a similar manner as the apparatus 100 using fasteners 80 and/or wall anchors 82; 3). attaching the canister assembly 220 and lid assembly 40; 4). installing a fresh battery 152 into the alarm assembly 147; 5). sliding the indicator button 144 to the "up" (e.g., raised) position; and 6). disposing or releasing of any captured rodents 90 as previously described.

One (1) embodiment of the disclosed method for installing and utilizing the apparatus 300 includes the following steps: 1). cutting an appropriate ceiling aperture 72 into the ceiling panel 70 to facilitate insertion of the recessed housing 322 therethrough; 2). attaching flange 354 to the ceiling panel 70 as previously described using fasteners 80 and/or wall anchors 82; 3). installing a fresh battery 152 into the alarm assembly 147; 4). inserting and attaching the canister assembly 20 within the recessed housing 322 by engaging the respective first bayonet features 30 and second bayonet features 55; 5). rotating the canister assembly 20 one-quarter (¼) of a turn to lock the first 30 and second 55 bayonet features together; 6). sliding the indicator button 144 to the "up" (e.g., raised) position; observing the position of the indicator button 144 and/or the illumination of the lamp 152; and 7). disposing or releasing of any captured rodents 90 as previously described.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A rodent trap apparatus comprising:
a mounting assembly connected to a support surface, said mounting assembly comprising an access hole;
a canister assembly connected to said mounting assembly, said canister assembly comprising a restricting orifice aligned with said access hole; and,
a lid assembly connected to said canister assembly, comprising an indicator button, aligned with said restricting orifice, said indicator button movable between a raised position and a depressed position, said indicator button further comprising:
a top surface disposed within said canister assembly; and,
a bottom surface disposed outside of a lid body;
wherein said bottom surface extends away from said lid assembly when said indicator button is in said depressed position;
wherein said access hole and said restricting orifice allow a rodent to enter said canister assembly but not exit said canister assembly.

2. The apparatus of claim 1, wherein said support surface comprises a vertical wall panel, wherein said wall panel comprises a wall aperture, and wherein said access hole is aligned with said wall aperture.

3. The apparatus of claim 1, wherein said support surface comprises a horizontal ceiling panel, wherein said ceiling panel comprises a ceiling aperture, and wherein said access hole is aligned with said ceiling aperture.

4. The apparatus of claim 1, wherein said canister assembly further comprises a canister body comprising an open first end and an open second end opposite said first end, and wherein said canister body defines an internal space.

5. The apparatus of claim 4, wherein said canister assembly further comprises at least one of poison and attractant disposed within said internal space.

6. The apparatus of claim 4, wherein said canister assembly further comprises a barrier panel disposed near said first end to enclose said internal space, and wherein said restricting orifice is disposed through said barrier panel.

7. The apparatus of claim 1, wherein said restricting orifice is offset from a center of said barrier panel.

8. The apparatus of claim 1, wherein said mounting assembly comprises:
a mounting assembly body, said access hole being disposed through said mounting assembly body; and,
a slide plate movably connected to an interior surface of said mounting assembly body to cover said access hole.

9. The apparatus of claim 1, wherein said lid assembly further comprises an alarm assembly, and wherein said alarm assembly is actuated by said indicator button when said indicator button is in said depressed position.

10. The apparatus of claim 9, wherein said alarm assembly comprises:
a switch in mechanical communication with said indicator button; and,
a lamp in electrical communication with said switch.

11. The apparatus of claim 1, wherein said restricting orifice comprises an inwardly tapered funnel extending into said canister assembly.

12. The apparatus of claim 1, wherein:
said canister assembly comprises a plurality of first bayonet features disposed around a perimeter thereof;
said mounting assembly comprises a plurality of second bayonet features disposed around perimeter thereof, and,
said plurality of first bayonet features and said plurality of second bayonet features engagably mate to connect said canister assembly and said mounting assembly.

13. The apparatus of claim 1, wherein said mounting assembly comprises a recessed housing assembly, and wherein said canister assembly is at least partially received within said recessed housing assembly.

14. A rodent trap apparatus comprising:
a mounting assembly connected to a support surface, said mounting assembly comprising:
a mounting assembly body;
an access hole disposed through said mounting assembly body, said access hole being suitably sized to allow ingress of a rodent; and,
a slide plate movably connected to an interior surface of said mounting assembly body to cover said access hole;
a canister assembly removably connected to said mounting assembly, said canister assembly comprising:
a tubular canister body comprising an open first end connected to said mounting assembly body and an open second end opposite said open first end, said canister body defining an internal space;
a barrier panel disposed near said open first end to enclose said internal space; and,
a restricting orifice disposed through said barrier panel, said restricting orifice comprising an inwardly tapered funnel extending into said internal space, said funnel comprising an entrance aperture suitably sized to allow ingress of said rodent into said internal space and an exit aperture suitably sized to prevent egress from within said internal space, said restricting orifice being offset from a center of said barrier panel, and said restricting orifice being aligned with said access hole when said canister assembly is connected to said mounting assembly; and, a lid assembly connected to said canister assembly, said lid assembly comprising:
  a lid body connected to said open second end of said canister body to enclose said internal space; and,
  an indicator button movably connected to said lid body, aligned with said restricting orifice, and comprising a top surface disposed within said internal space and a bottom surface disposed outside of said lid body;
wherein said rodent is entrapped within said internal space after passing through said access opening and said restricting orifice; and,
wherein said indicator button is linearly translatable between a raised position indicating that said rodent is not within said internal space and a depressed position indicating that said rodent is within said internal space.

15. The apparatus of claim 14, wherein said bottom surface comprises a bright color, and wherein said bottom surface extends away from said lid assembly when said indicator button is in said depressed position.

16. The apparatus of claim 14, wherein said lid assembly further comprises an alarm assembly, and wherein said alarm assembly is actuated by said indicator button when said indicator button is in said depressed position.

17. The apparatus of claim 16, wherein said alarm assembly comprises:
  a switch in mechanical communication with said top surface of said indicator button when said indicator button is in said depressed position; and,
  a lamp in electrical communication with said switch.

* * * * *